(12) United States Patent
Smith

(10) Patent No.: US 11,742,158 B2
(45) Date of Patent: Aug. 29, 2023

(54) COMBINATION AC DISCONNECT SWITCH AND SURGE PROTECTION DEVICE

(71) Applicant: Thomas Jay Smith, Mechanicville, NY (US)

(72) Inventor: Thomas Jay Smith, Mechanicville, NY (US)

(*) Notice: Subject to any disclaimer, the term of this patent is extended or adjusted under 35 U.S.C. 154(b) by 52 days.

(21) Appl. No.: 17/456,057

(22) Filed: Nov. 22, 2021

(65) Prior Publication Data

US 2022/0165514 A1 May 26, 2022

Related U.S. Application Data

(60) Provisional application No. 63/198,895, filed on Nov. 20, 2020.

(51) Int. Cl.
*H01H 9/02* (2006.01)
*H02H 9/04* (2006.01)

(52) U.S. Cl.
CPC .......... *H01H 9/0271* (2013.01); *H02H 9/044* (2013.01); *H02H 9/045* (2013.01)

(58) Field of Classification Search
CPC .......... H02H 9/04; H02H 9/005; H02H 9/044; H02H 9/045; H02H 3/207; H02H 3/52; H02H 3/20; H02H 3/025; H02H 5/005; H01H 9/542; H01H 9/0264; H01H 9/0271; H01H 9/14; H01H 9/161; H01H 33/596

See application file for complete search history.

(56) References Cited

U.S. PATENT DOCUMENTS

| | | | |
|---|---|---|---|
| 2002/0054465 A1* | 5/2002 | Gerlach | H01T 4/06 361/111 |
| 2016/0157310 A1* | 6/2016 | Cortese | H01H 71/04 315/291 |

* cited by examiner

*Primary Examiner* — Bryan R Perez
(74) *Attorney, Agent, or Firm* — Dunlap Bennett & Ludwig, PLLC

(57) ABSTRACT

An AC disconnect switch with integral surge protection. The intrinsic pullout head of the AC disconnect switch embodies a surge protection device, thereby eliminating the need for an extrinsic surge protection device.

2 Claims, 4 Drawing Sheets

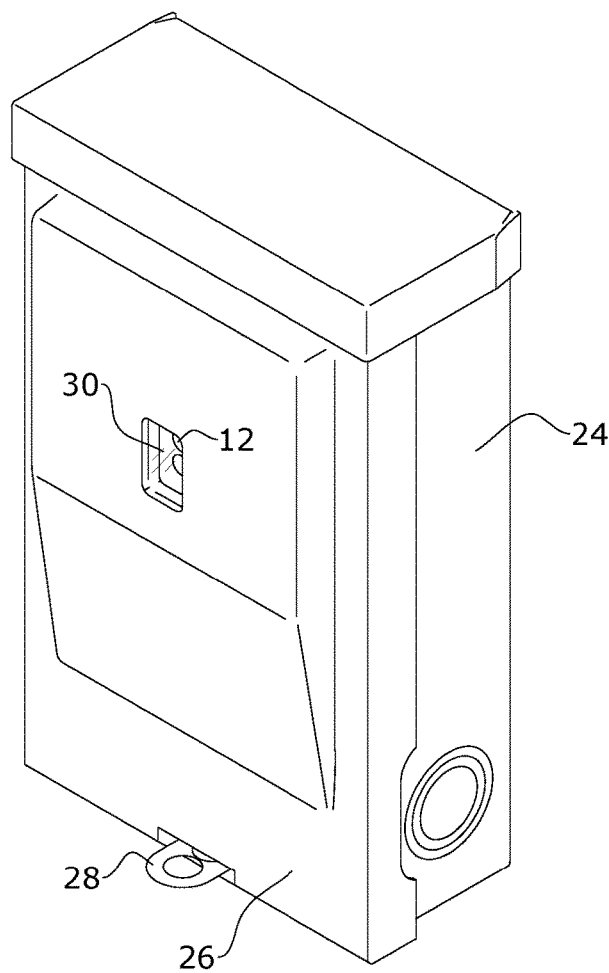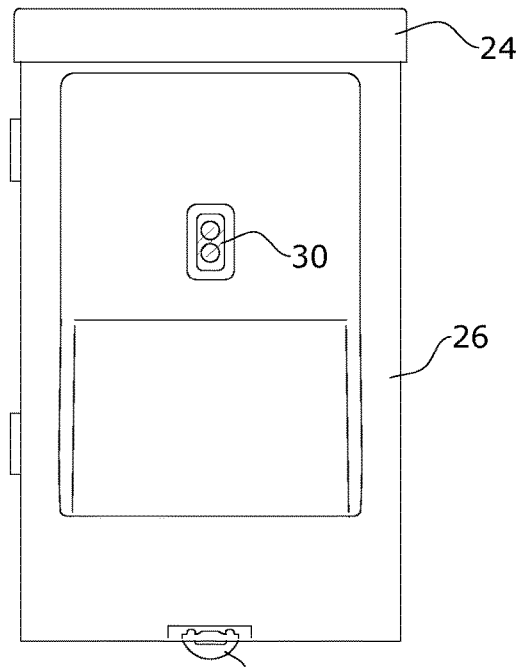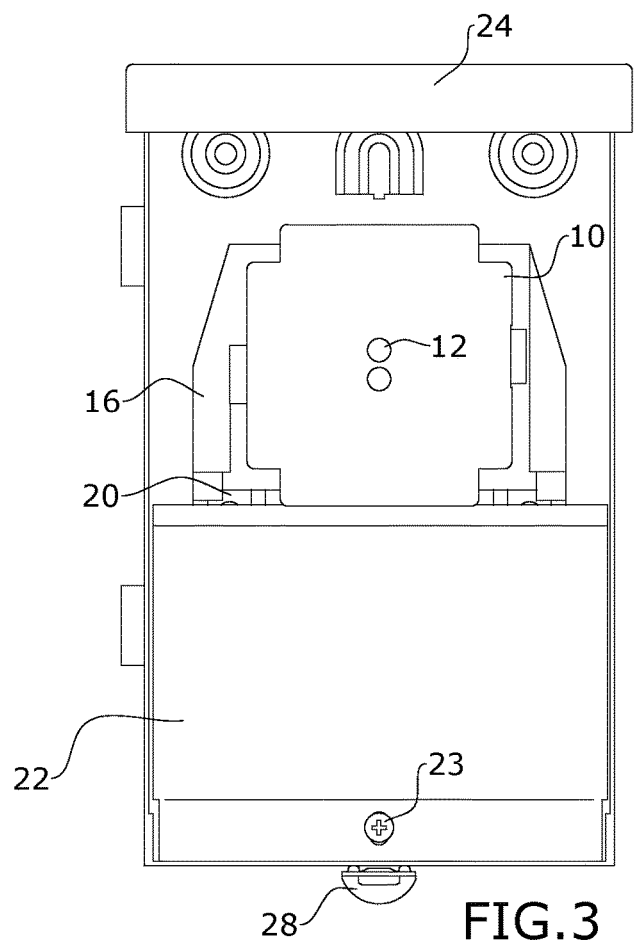
FIG.1
FIG.2
FIG.3

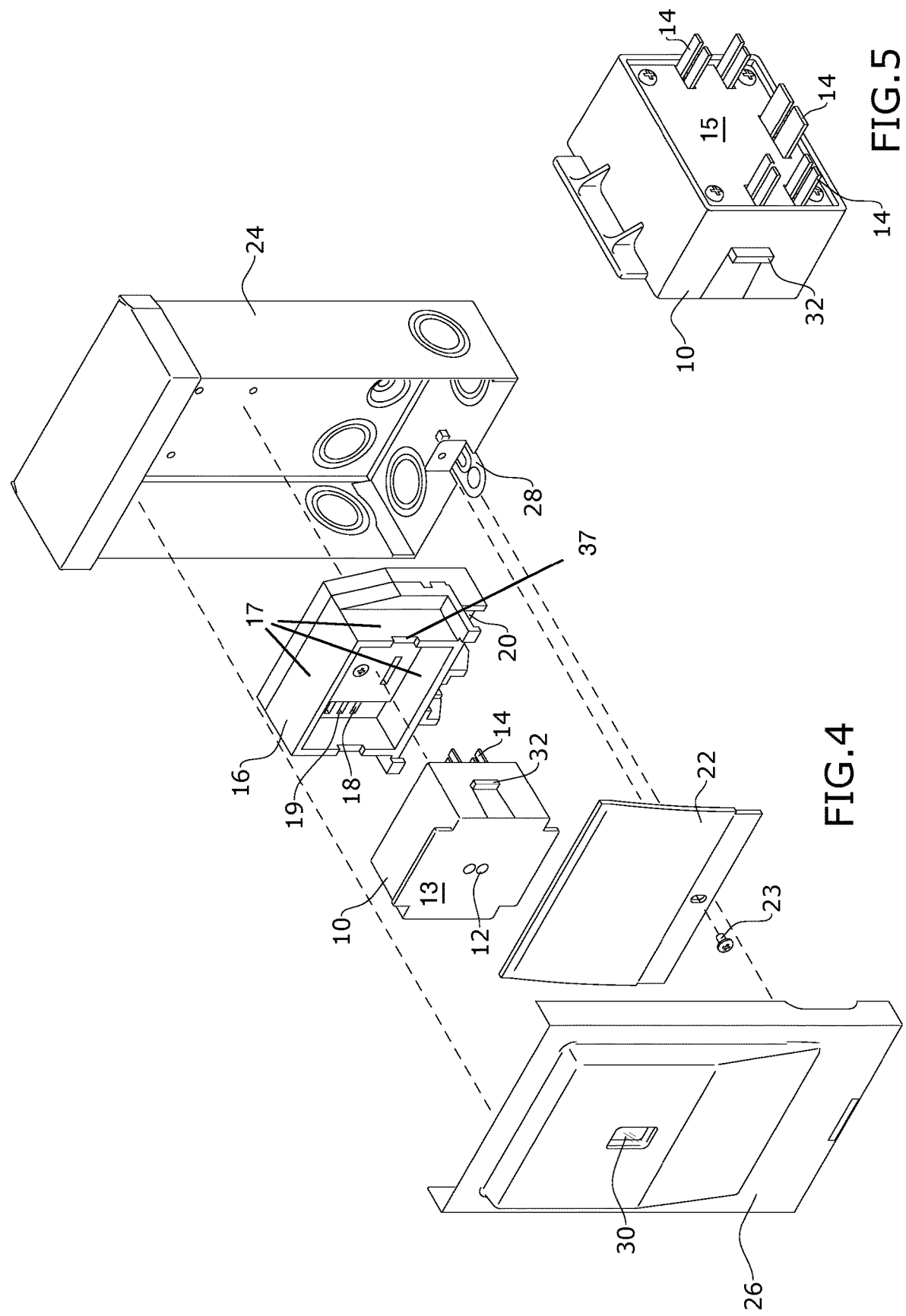

COMBINATION AC DISCONNECT SWITCH AND SURGE PROTECTION DEVICE

CROSS-REFERENCE TO RELATED APPLICATION

This application claims the benefit of priority of U.S. provisional application No. 63/198,895, filed 20 Nov. 2020, the contents of which are herein incorporated by reference.

BACKGROUND OF THE INVENTION

The present invention relates to an alternating current (AC) switch device, and more particularly, to a combination of an AC disconnect switch and surge protective device.

An electrical disconnect device is designed to break the flow of current in an AC circuit wherein the AC circuit could include a switch, a breaker, a plug-in cord, or other electrical devices. The AC disconnect device serves to stop the flow of power to these electrical devices to ensure that an electrical circuit is completely de-energized for service or maintenance of the electrical device. Additionally, the AC disconnect devices are typically designed to provide visible confirmation that the power is off.

AC disconnect devices (also known as AC disconnect switches, AC disconnect enclosures, AC disconnect closures, etc.) typically include an enclosure with a cover, a stationary terminal block assembly mounted within the enclosure, and a pullout head. The pullout head removably connects a plurality of conductive contact blades (in the pullout head) to a complementary plurality of contact slots/stabs (in terminal block assembly) that either completes or breaks the circuit depending on how the pullout head is inserted. When the pullout head is inserted to complete the circuit, enabling current and power to flow to the load, the word 'ON' is typically visible on a side of the housing/block assembly of the plurality of contacts. Likewise, when the pullout head is inserted to break the flow of current in the circuit, the word 'OFF' is visible on (typically) the other side of the contact housing. Conventionally, 'ON' and 'OFF' are never visible simultaneously when the pullout head is electrically connected to the plurality of contact slots.

Separately, a surge protector is an appliance or device intended to protect electrical devices from voltage spikes in alternating current (AC) circuits. A voltage spike is a transient event, typically lasting 1 to 30 microseconds, that may reach voltages sufficient to destroy a wide variety of electronic devices that happen to be plugged in at the time. Typically, the surge device will trigger at a set voltage, around 3 to 4 times the mains voltage, and divert the current to ground.

Frequently, consumers are unaware of the need for surge protection for equipment connected to an AC disconnect switch, even though such equipment tends to be expensive, such as Heating, Ventilation, and Air Conditioning (HVAC) equipment. Furthermore, the failure of such equipment (from a transient power surge) can leave a residential or commercial space uninhabitable. As a result, many times surge protection devices must be purchased and connected separately to the AC disconnect device/enclosure. This is problematic because, as mentioned above, AC disconnect devices are adapted to quickly provide visible confirmation of the electrical state ('ON/OFF') of the associated circuit and adding an extrinsic surge protection device can frustrate that functionality. Similarly, adding an extrinsic surge protection device can stymie access to such AC disconnect closures because, in practice, AC disconnect closures are often mounted in locations where direct access may be limited. Therefore, it is important that the practitioner operating the AC disconnect closure have easy access from all angles to the terminal block—extrinsic surge protection devices can block some of these angles.

As can be seen, there is a need for an AC disconnect device with integral surge protection. The combination of an AC disconnect switch and a surge protective device embodied in the pullout head of the AC disconnect switch eliminates the need to provide a separately mounted surge protective device to an AC disconnect device/closure.

SUMMARY OF THE INVENTION

In one aspect of the present invention, a combination alternating current (AC) disconnector switch and a surge protection device, wherein the surge protection device is embodied in a pullout head of the AC disconnector switch.

In another aspect of the present invention, the above-mentioned combination includes wherein the AC disconnector switch further comprises a terminal block assembly having a plurality of sheath walls dimensioned to receive the pullout head in an enabled condition and a disabled condition disabling the AC disconnector switch, wherein the pullout head has a front face and an opposing rear face, wherein the rear face has a plurality of conductive contacts enabling the enabled condition, and wherein the front face has one or more indicator lights indicating the enabled condition and the disabled condition.

In yet another aspect of the present invention, the above-mentioned combination further includes an enclosure with a rear wall, wherein the terminal block assembly is mounted to the rear wall, wherein the terminal block assembly further comprises a plurality of wire connectors facilitating the enabled condition, wherein the plurality of wire connectors is disposed below the plurality of sheath walls, and wherein the enclosure provides a protective cover in front of the plurality of wire connectors, wherein the enclosure further comprises a closure cover pivotably connected thereto in such a way as to be movable between an open position and a closed position covering the terminal block assembly, wherein the closure cover has a window through which the one or more indicator lights are visible when the closure cover is in the closed position.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention.

FIG. 2 is a front elevation view of an exemplary embodiment of the present invention.

FIG. 3 is a front elevation view of an exemplary embodiment of the present invention, with the cover removed.

FIG. 4 is an exploded perspective view of an exemplary embodiment of the present invention.

FIG. 5 is a perspective view of an exemplary embodiment of a pullout head 10 of the present invention, illustrating the contact side of the pullout head that embodies a surge protector.

FIG. 6 is a front elevation view of an exemplary embodiment of the pullout head 10 of the present invention, illustrating the enabled condition, with the AC disconnector switch on.

DETAILED DESCRIPTION OF THE INVENTION

Figure 6:
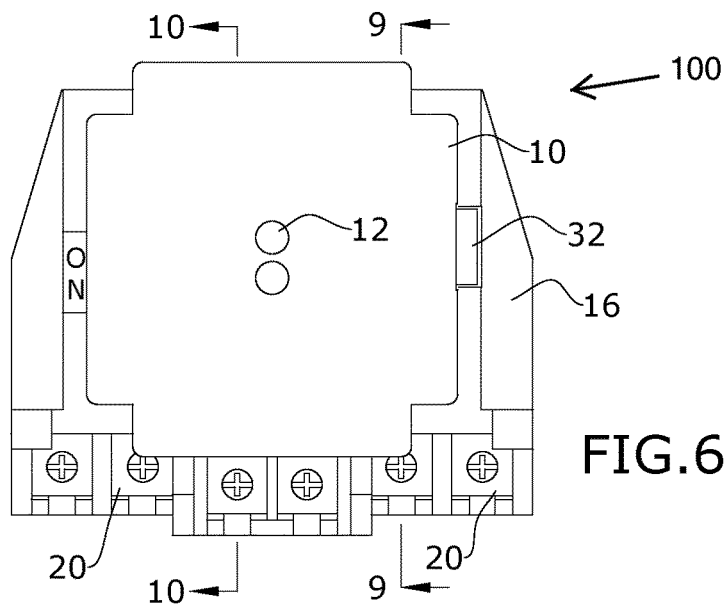
Figure 7:
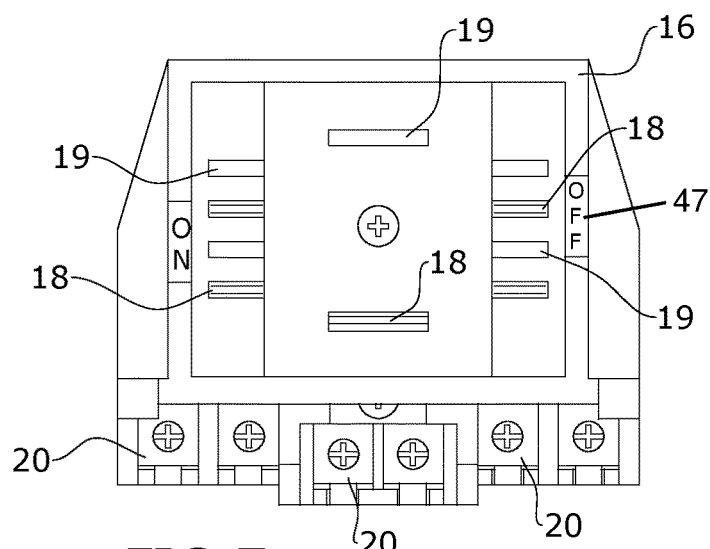
FIG. 7 is a front elevation view of an exemplary embodiment of a terminal block assembly of the present invention without the pullout head 10 engaged.
Figure 8:
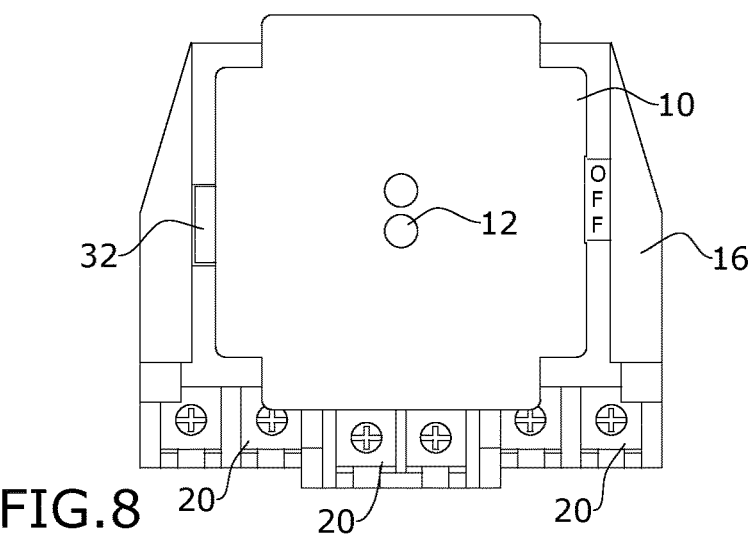
FIG. 8 is a front elevation view of an exemplary embodiment of the pullout head 10 of the present invention, illustrating the disabled condition, with the AC disconnector switch off.
Figure 9:
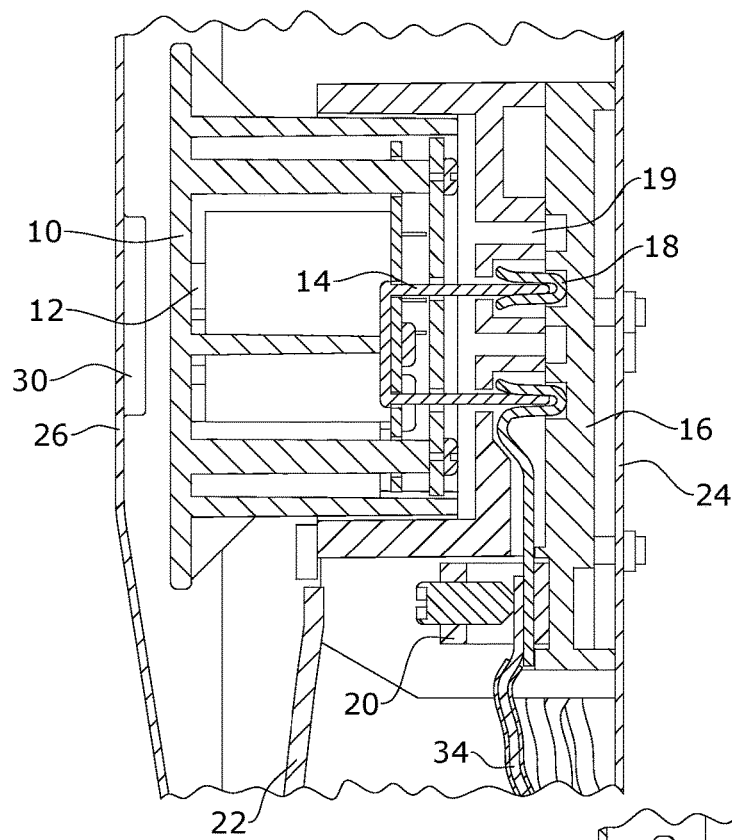
FIG. 9 is a section view of an exemplary embodiment of the present invention, taken along line 9-9 in FIG. 6.
Figure 10:
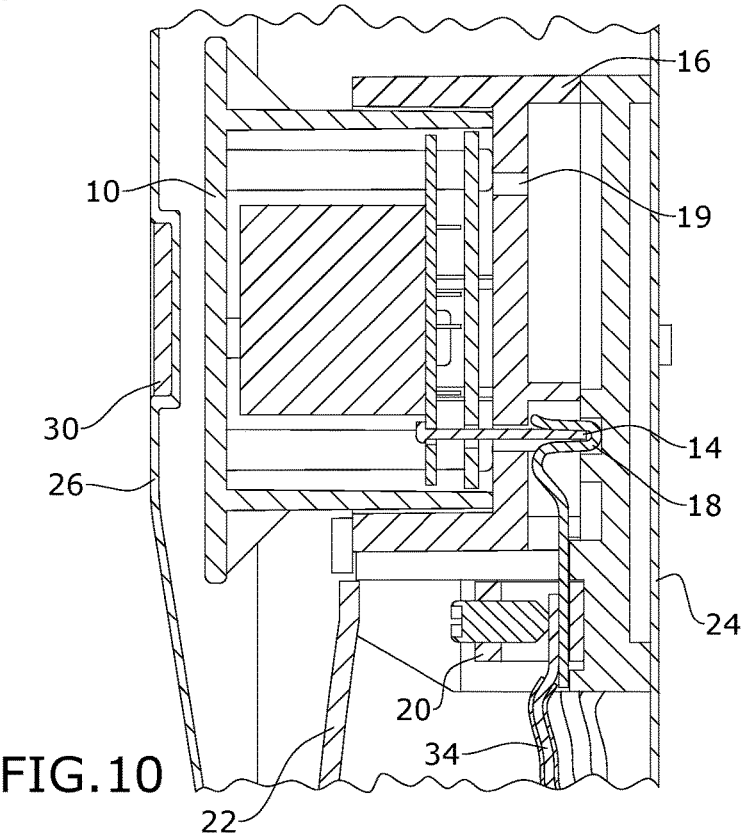
FIG. 10 is a section view of an exemplary embodiment of the present invention, taken along line 10-10 in FIG. 6.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an AC disconnect switch with integral surge protection. The intrinsic pullout head of the AC disconnect switch embodies a surge protection device, thereby eliminating the need for an extrinsic surge protection device.

Referring the FIGS. 1 through 10, the present invention may include a combination AC disconnect switch and surge protective device 100. The combination device 100 may include an enclosure 24. The enclosure 24 has a back wall, a top wall, a bottom wall, and side walls defining a front opening communicating to a compartment. The bottom wall provides a forward protruding latch 28. The enclosure 24 also has a pivotably connected cover 26 that is movable between an open position and a closed position, closing off the opening to the compartment. The cover 26 may also have a slot through which the latch 28 protrudes through in the closed position. The cover 26 may provide a transparent status window 30 through which the compartment is visible.

A terminal block assembly 16 may be mounted within the compartment of the enclosure 24 against the back wall. The block assembly 16 may have a plurality of contact slots 18 and non-contact slots 19, which upon receipt of a conductive element enable or disable, respectively, the power to the electrical equipment to which the AC disconnect switch (and a surge protective device) is operatively associated. The plurality of contact slots 18 and non-contact slots 19 are typically provided along a base of the block assembly 16, wherein this base is circumscribed by sheathing walls 17. The plurality of contact slots 18 is electrically connected via wire connectors 20 to wiring 34 that is further electrically connected to the electrical equipment associated with the combination device 100.

Two of the sheathing walls may each provide an indicative cutout 37. Each indicative cutout may provide an enablement indicium 47, such as 'On' or 'Off' to visible identify the enabled condition or the disabled condition, respectively.

A pullout head 10 may embody the combination device 100. The pullout head 10 has an operative surge protector integrated therein. The pullout head 10 has a front face 13 and a rear face 15. The front face 13 may provide status indicators 12, such as LED lights. The status indicators 12 indicate the enabled condition and the disabled condition. These status indicators 12 may be visible through the window 30 when the cover 26 is in the closed position. The rear face 15 provides the conductive contacts 14 that may slide into the contact slots 18 to move the present invention to the enabled condition. When the conductive contacts 14 are received in the non-contact slots 19 the present invention is in the disabled condition.

The body of the pullout head 10 is dimensioned and adapted to be slidably received in the space defined by the sheathing walls 17 in either the enabled condition (wherein the body is inserted in a first orientation) or the disabled condition (wherein the body is inserted in a second orientation that is 180-degrees offset from the first orientation). Along the body of the pullout head 10 is an indication tab 32 that fills one of the two indicative cutouts 37, obscuring the associated enablement indicium 47 when the body is slidably receive in the sheathing walls 17. For instance, when the present invention is in the enabled condition, the indication tab 32 obscures the 'Off' enablement indicium 47 so that only the 'On' enablement indicium 47 is visible, as illustrated in FIG. 6.

Below the terminal block assembly 16 may be a protective cover 22 to shield the wire connectors 20 and wiring 34 disclosed above. The protective cover 22 shields the terminal lugs once installation of the wiring 34 and wire connectors 20 has been completed. A fastener 23 may be operatively associable with the latch 28 to secure the protective cover 22.

As stated above, often consumers are unaware of the need for surge protection for equipment connected to an AC disconnect switch. By providing the combination AC disconnect switch and surge protective device 100, wherein the pullout head 10 of the AC disconnect switch has an integral surge protection device, the present invention solves the problem of having to provide a separately mounted, extrinsic surge protective device. The disclosure includes a pullout head with a surge protector device embodied therein. Thereby, the intrinsic surge-protective pullout head is dimensioned and adapted to be housed in any enclosure dimensioned to receive the terminal block assembly, thereby avoiding loss of access to any such enclosure by adding an extrinsic surge protector device. Additionally, the AC disconnector switch functionality cannot be used without a surge protector, essentially rendering it foolproof for untrained users of expensive electrical equipment, who might otherwise forget to add, fail to add, or improperly add the extrinsic needed surge protection device.

The integrated surge protector may be connected and wired in any suitable manner. One skilled in the art of AC disconnect switches with knowledge of surge protectors may be capable of wiring the integrated surge protector within the disconnect pullout head 10. Being a part of the wired connection, the surge protector thus provides protection from dangerous current and voltage surges to the connected equipment.

A person familiar with the installation of AC disconnect switches may install the pullout head 10 in a pre-existing terminal block assembly, or alternatively install a kit that includes the pullout head 10 complementary terminal block assembly into any properly sized closure device in the proper manner, thereby providing an AC disconnect with integral surge protection ala carte. The present invention may be connected to any electrical equipment, thereby providing protection from damaging electrical surges.

A method of using the present invention may include the following. The combination AC disconnect switch and surge protective device 100 disclosed above may be provided. Thereafter, the combination device 100 may be used in the same manner as a standard AC disconnect switch.

For clarity, only those aspects of the system germane to the invention are described, while product details well known in the art may be omitted. In addition, many embodiments of the present invention have application to a wide range of industries. To the extent the present application discloses a system, the method implemented by that system is within the scope of the present invention. Further, to the extent the present application discloses a method, a system of apparatuses configured to implement the method are within the scope of the present invention. In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A combination alternating current (AC) disconnector switch and a surge protection device, wherein the surge protection device is embodied in a pullout head of the AC disconnector switch, wherein the AC disconnector switch further comprises a terminal block assembly having a plurality of sheath walls dimensioned to receive the pullout head in an enabled condition and a disabled condition disabling the AC disconnector switch, wherein the pullout head has a front face and an opposing rear face, wherein the rear face has a plurality of conductive contacts enabling the enabled condition, and wherein the front face has one or more indicator lights indicating the enabled condition and the disabled condition; and an enclosure with a rear wall, wherein the terminal block assembly is mounted to the rear wall, wherein the terminal block assembly further comprises a plurality of wire connectors facilitating the enabled condition, wherein the plurality of wire connectors is disposed below the plurality of sheath walls, and wherein the enclosure provides a protective cover in front of the plurality of wire connectors.

2. The combination of claim 1, wherein the enclosure further comprises a closure cover pivotably connected thereto in such a way as to be movable between an open position and a closed position covering the terminal block assembly, wherein the closure cover has a window through which the one or more indicator lights are visible when the closure cover is in the closed position.

* * * * *